3,095,408
PROCESSES IN PEPTIDE SYNTHESIS
George W. Anderson, Darien, and Anne C. McGregor, Glenbrook, Conn., assignors to American Cyanamid Company, New York, N.Y., a corporation of Maine
No Drawing. Filed Mar. 19, 1957, Ser. No. 646,982
9 Claims. (Cl. 260—112)

This invention relates to peptide synthesis and reagents therefor and more particularly to new N-tertiarybutyloxycarbonyl derivatives of amino acids and of peptides, their preparation and a new process for the synthesis of peptides based on the use of said derivatives.

It is an object of this invention to provide new N-tertiarybutyloxycarbonyl derivatives of amino acids and N-tertiarybutyloxycarbonyl derivatives of peptides which products are useful reagents in simplifying the synthesis of complex peptides.

It is a further object of this invention to provide a process for the preparation of N-tertiarybutyloxycarbonyl derivatives of amino acids and peptides.

It is a still further object of this invention to provide, for the first time, an improved process for the synthesis of peptides which makes use of the aforesaid N-tertiarybutyloxycarbonyl derivatives and eliminates the need for isolating intermediates.

In peptide synthesis different amino acids are joined to build up a molecule having a desired chain length or molecular weight and more specifically in certain instances to obtain a particular combination of linked amino acid moieties with the moieties arranged in a particular order. Since an amino acid possesses one or more carboxyl groups as well as one or more primary amine groups as substituents it may, therefore, react under suitable conditions either as an acid or as a base. Consequently, any process for preparing a specific peptide based on merely bringing together under reactive conditions a quantity of one amino acid and a stoichiometrically equivalent quantity of a different amino acid is largely impractical for the following reasons. First, no reaction would occur with many peptide-forming reagents due to the zwitterion (or self-neutralizing) character of amino acids. When reaction does occur, the reaction product from such a process proves not to be a pure peptide because under such conditions three different reactions have taken place simultaneously. This may be illustrated, for instance, where the amino acids are glycine and phenylalanine. As one reaction, an undesirable one, a glycine amino group reacts with a glycine carboxy group as a beginning toward the formation of glycine type polymer. As a second reaction, also an undesirable one, a phenylalanine amino group reacts with a phenylalanine carboxy group as a beginning towards the formation of a phenylalanine type polymer. As the third reaction, which is the desired one, a glycine amino group reacts with a phenylalanine carboxy group or a glycine carboxy group reacts with a phenylalanine amino group. Obviously, the combined effect of these three basic reactions is the production of a chaotic mixture of peptide-polymeric compounds. To prevent the abovementioned undesired reactions and obtain only the desired reaction between two amino acids the amino group of one of the amino acids involved in the reaction must be effectively protected or blocked from taking part in the reaction while the carboxy group of the other likewise must be so protected, the latter group usually by prior esterification. After the desired reaction, also called a peptide-forming reaction, is complete one or more of the protecting groups is removed from the thus-formed peptide derivative, thereby rendering the peptide available for subsequent reaction with another amino acid derivative. Also involved in peptide synthesis is the reaction between an N-protected peptide moiety and an amino acid ester or a peptide ester. The peptides in these instances may be di-, tri- or larger peptides.

Heretofore, it has been customary to protect the amino nitrogen with groups such as benzyloxycarbonyl (carbobenzoxy), ring-substituted benzyloxycarbonyl, para-toluenesulfonyl (tosyl) or triphenylmethyl, to mention important ones. While under suitable conditions such protective groups are of value in peptide synthesis, nevertheless, they offer serious disadvantages which are not associated with our invention. For instance, while benzyloxycarbonyl and ring-substituted benzyloxycarbonyls can be removed by catalytic hydrogenation, reaction with sodium and liquid ammonia or reaction with hydrogen bromide in glacial acetic acid, these reactions necessitate the isolation of the derivative from the medium in which the peptide was formed. The tosyl protecting group can be removed only by reaction with sodium in liquid ammonia solution. Obviously, then, the tosyl derivative of the peptide must be isolated from the original peptide-forming medium. In the case of the triphenylmethyl derivatives of peptides, even though it might be possible to cleave the group in the original solution, by-products such as triphenylmethylhalides would interfere with subsequent peptide reactions and, therefore, the cleaved product must be removed from the medium before it can be of effective use in further peptide reactions.

We have found that the tertiarybutyloxycarbonyl radical

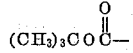

can be used effectively as the amine blocking group in peptide synthesis, and that when it is so used it can be readily removed or cleaved from the amino nitrogen by the action of a hydrogen halide while the peptide moiety is still in the original peptide-forming medium. We have further discovered that the by-products from the tertiarybutyloxycarbonyl cleavage reaction are either gases or low boiling liquids which are easily removed from the peptide-forming medium, permitting the reaction of the cleaved peptide with a new tertiarybutyloxycarbonyl amino acid or tertiarybutyloxycarbonyl peptide without the need for isolating any peptide product at any time from the peptide-forming medium. Thus we have found the tertiarybutyloxycarbonyl radical in the role of amino nitrogen protecting group to be the keystone of a method of synthesizing peptides wherein the cycle comprising the peptide-forming reaction followed by the cleavage reaction is repeated until the peptide derivative of desired chain length and constitution is prepared. This desired peptide is then isolated as the first product to be isolated from the peptide-forming medium during the entire sequential process. Because no intermediates need be isolated the yield of desired peptide is often improved over that obtained by the prior art processes wherein intermediates need to be isolated at the end of each stage. By providing for increased yields of peptides along with speed and convenience the tertiarybutyloxycarbonyl radical represents an outstanding improvement over the amino nitrogen-protecting groups of the prior art.

The outstanding performance of the tertiarybutyloxycarbonyl radical as an amino nitrogen-protecting group was unexpected in view of certain earlier work by Boissonnas and Preitner as reported in Helv. 36, 875 (1953). These investigators reported secondarybutyloxycarbonyl and ethyloxycarbonyl radicals as being relatively difficult to remove from the amino nitrogen following the peptide reaction. Boissonnas and Preitner using hydrogen bromide in glacial acetic acid at 20° C. found that even after 3 days only 50% cleavage of the secondarybutyloxycarbonyl group and only 25% cleavage of the ethyloxycarbonyl group, respectively, had occurred. In striking contrast thereto, we found that under comparable conditions at least 86% cleavage of the tertiarybutyloxycarbonyl group was obtained almost instantaneously. It was, therefore, indeed surprising that the tertiarybutyloxycarbonyl radical proved to be such an easily removable N-protective group.

Tertiarybutyloxycarbonyl derivatives of amino acids or peptides may be prepared by reacting para-nitro phenyl tertiary butyl carbonate

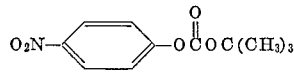

with the desired amino acid or peptide. The reagent para-nitrophenyl tertiary-butyl carbonate is in itself novel and it, along with a process for preparing it, is fully described and claimed in our copending application S.N. 646,983, filed March 19, 1957, now abandoned. Briefly, para-nitrophenyl tertiary butyl carbonate may be prepared by the successive steps of reacting tertiary butanol with p-nitrophenylchloroformate in the presence of a tertiary amine base, such as pyridine, and then recovering the thus-formed para-nitrophenyl tertiary butyl carbonate therefrom by conventional extraction-evaporation-recrystallization techniques.

In general, the reaction between the amino acid or peptide and p-nitrophenyl tertiary butyl carbonate is carried out in the presence of a water-miscible organic solvent. Tertiary butanol is the preferred solvent inasmuch as it is a particularly effective solvent for both the p-nitrophenyl tertiary butyl carbonate and the amino acid or peptide salt. This system is adjusted to a pH of between about 8 and 12 by addition of aqueous alkali. The reaction will proceed under reasonable temperature conditions. For instance, at temperatures within a range of about 80 to 100° C., the reflux temperature for tertiary butanol-water solutions, the reaction is complete within thirty minutes. Temperatures as low as room temperatures may be used, in which case a reaction time of several hours is necessary. The necessary pH conditions will vary within the 8 to 12 range depending on the requirements for the particular amino acid or peptide and such conditions may be obtained by using an appropriate inorganic base or a tertiary amine base. The solution containing the salt of the tertiarybutyloxycarbonyl derivative of the amino acid or peptide is then subjected to conventional procedures to separate out the desired tertiarybutyloxycarbonyl amino acid or peptide derivative. For instance, the solution may be subjected to distillation to remove the tertiary butanol. The resulting aqueous solution or suspension is processed in accordance with the nature of the salt involved. In cases where sodium bicarbonate, sodium carbonate or sodium hydroxide are used, the solution is filtered to remove precipitated sodium p-nitrophenolate, made slightly acid by addition of mineral acid and extracted with ether to remove any p-nitrophenol and unreacted p-nitrophenyl tertiary-butyl carbonate. Finally, the aqueous solution is further acidified and then subjected to extraction with diethyl ether. The tertiarybutyloxycarbonyl derivative is then recovered from the ether layer by evaporating the ether. Generally, the amino acid or peptide derivative is recoverable in crystalline form, although in some instances oils result.

Our improved and simplified process for synthesizing peptides wherein intermediates are not isolated, as hereinabove discussed, essentially involves a two stage cycle, the first stage of which is the peptide-forming reaction and the second stage of which is the cleaving reaction to remove the N-protecting group. In general, the first stage reaction is conducted in the presence of an alkyl pyrophosphate peptide-promoting reagent and an inert (to the reactants) mineral acid-acceptor such as a diphosphite, e.g., a di-(lower)alkyl phosphite, or a triphosphite, e.g., a tri-(lower alkyl) phosphite, a tri-(lower alkenyl) phosphite having allylic unsaturation or a lower alkyl alkylene phosphite. The use of the triphosphites in amide forming reactions is described fully in U.S. Patent No. 2,722,526 issued to G. W. Anderson and R. W. Young. Of the triphosphites, trimethyl phosphite, and triethyl phosphite are generally preferred. The first stage reaction is completed by heating the mixture for about 15 minutes at 90° C. and then cooling to room temperature or below. In general, the second stage reaction is conducted by treating the cooled reaction mixture from stage one with a solution of a hydrogen halide in a dialkyl phosphite, thereby producing a reactable cleaved peptide ester in dissolved and pure form. An alkyl phosphite is the preferred solvent for the hydrogen halide. As the hydrogen halide either hydrogen chloride or hydrogen bromide is preferred. It may be desirable to warm the reaction medium at the end of stage two for the purpose of expediting the removal of the gaseous and low boiling by-products obtained during the cleavage reaction. Repetition, as desired, of this two-stage cycle is begun by adding to the solution of the cleaved peptide ester obtained at the end of stage two a stoichiometrically appropriate quantity of a tertiarybutyloxycarbonyl derivative of either an amino acid or a peptide, the pyrophosphite reagent and the trialkyl phosphite hydrogen halide acceptor.

By the term "amino acids" as used herein we have reference to those amino acids which comprise the building blocks, via peptide linkages, for large peptides such as insulin, adrenocorticotropic hormones, oxytocin, various antibacterial agents and proteinaceous material in general. It is presently a matter of general agreement that there are some twenty-odd such key amino acids. This group includes alanine, phenylalanine, arginine, aspartic acid, asparagine, cysteine, cystine, glutamic acid, glutamine, methionine, glycine, histidine, leucine, isoleucine, norleucine, lysine, ornithine, proline, hydroxy proline, serine, tyrosine, valine, tryptophane and threonine. By the term "peptides" we have reference to peptides derivable from members of such a group of amino acids.

As mentioned above, our new N-tertiarybutyloxycarbonyl derivatives of amino acids and of peptides are useful reagents in simplifying the synthesis of complex peptides. For instance, we have found the Du Vigneaud synthesis (J. Am. Chem. Soc. 76, 3107–3121) of the peptide oxytocin, a pituitary hormone which stimulates uterine contractions, is made very considerably easier and much less time-consuming when these derivatives are applied thereto. Oxytocin has the following structural formula as expressed in terms of the Brand nomenclature system (E. Brand and J. T. Edsall, Ann. Rev. Biochem. 16, 224).

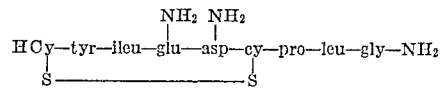

Du Vigneaud et al. starting in step-wise manner from the glycine end prepared a key intermediate, the ethyl ester of N-benzyloxycarbonyl - L - prolyl - L - leucyl-glycinate, which they designate as Z·pro-leu-gly·O·Et (where Z- is the conventional abbreviation for the benzyloxycarbonyl-, or carbobenzoxy-group). In contrast to the step-wise method of Du Vigneaud wherein reaction products are necessarily isolated at the end of each step, we can make this same intermediate without such step-wise isolations by our new sequential process using the specific conditions as given in Example 22 below.

In presenting the following examples it is not our intention to limit our invention thereby but rather to illustrate the salient features thereof.

EXAMPLE 1

*Tertiarybutyloxycarbonyl-L-Phenylalanine*

1.65 g. L-phenylalanine, 3.59 g. p-nitrophenyl tertiary butyl carbonate and 2.65 g. sodium carbonate were refluxed together in 20 ml. 50% aqueous tertiary butanol for 30 minutes. After evaporation of the tertiary butanol, the mixture was filtered, acidified with hydrochloric acid to a pH of 6 and extracted with ether, the ether layer then being discarded. The aqueous solution was then acidified to a pH of 1 and the product extracted into diethyl ether. Evaporation of the ether gave a crystalline product which was recrystallized from ethyl acetate-petroleum ether. The yield was 73% and the melting point was 79–80° C.

EXAMPLE 2

*Tertiarybutyloxycarbonyl-DL-Alanine*

0.89 g. DL-alanine, 2.99 g. p-nitrophenyl tertiary butyl carbonate and 8 ml. of 2.5 N aqueous NaOH were refluxed together in 10 ml. tertiary butanol for 30 minutes. The product was isolated by the same procedure as described in Example 1. After recrystallization from ether-petroleum ether, the crystalline material melted from 110.5–111.5° C.

EXAMPLE 3

*Tertiarybutyloxycarbonyl-L-Alanine*

0.89 g. L-alanine, 2.99 g. p-nitrophenyl tertiary butyl carbonate and 9 ml. 10% aqueous NaOH were refluxed in 10 ml. tertiary butanol for 30 minutes. The product was obtained in the same manner as described in Example 1 and was recrystallized from ether-petroleum ether. The melting point was 82–83° C.

EXAMPLE 4

*Tertiarybutyloxycarbonyl Glycine*

15.0 g. glycine, 47.8 g. p-nitrophenyl tertiary butyl carbonate and 200 ml. aqueous 2 N NaOH were refluxed in 200 ml. tertiary butanol for 30 minutes. The tertiary butanol was then removed by distillation and the product isolated in the same manner as described in Example 1. The product had a melting point of 88–89° C. after recrystallization from ethyl acetate-petroleum ether. The same experiment run using sodium carbonate instead of NaOH was unsuccessful.

EXAMPLE 5

*Tertiarybutyloxycarbonyl-L-Leucine*

1.31 g. L-leucine, 2.99 g. p-nitrophenyl tertiary butyl carbonate and 9 ml. 10% aqueous NaOH were refluxed in 10 ml. tertiary butanol for 30 minutes. The product was isolated in the same manner as described in Example 1 and was crystallized as the monohydrate. After recrystallization from tertiary butanol and water, the material melted from 48–57° C.

EXAMPLE 6

*Tertiarybutyloxycarbonyl-L-Isoleucine*

1.31 g. L-isoleucine, 3.59 g. p-nitrophenyl tertiary butyl carbonate and 2.65 g. sodium carbonate were refluxed together in 20 ml. 50% aqueous tertiary butanol for 30 minutes. The product was isolated by the same procedure as described in Example 1 and crystallized as a hydrate. It was recrystallized from ethanol and water and melted from 48–52° C.

EXAMPLE 7

*Tertiary Butyloxycarbonyl (E-Carbobenzoxy)-L-Lysine*

1.40 g. E-carbobenzoxy-L-lysine, 1.67 g. p-nitrophenyl-tertiary butyl carbonate and 1.27 g. sodium carbonate were refluxed together in 20 ml. 50% aqueous tertiary butanol for 30 minutes. The product was obtained as an oil using the same isolation procedure as described in Example 1. A neutral equivalent on the oil was 388, calculated value is 380.

EXAMPLE 8

*Tertiarybutyloxycarbonyl-L-Methionine*

1.49 g. L-methionine, 3.59 g. p-nitrophenyl tertiary butyl carbonate and 2.65 g. sodium carbonate were refluxed together in 20 ml. 50% aqueous tertiary butanol for 30 minutes. The product was obtained as an oil using the same procedure as described in Example 1. The neutral equivalent was found to be 252, calculated value is 249.

EXAMPLE 9

*Tertiarybutyloxycarbonyl-DL-Phenylalanine*

The exact procedure for preparing tertiarybutyloxycarbonyl-L-phenylalanine as described in Example 1 was used. The product recrystallized from ethyl acetate-petroleum ether, melted at 103–104° C.

EXAMPLE 10

*Tertiarybutyloxycarbonyl-L-Proline*

1.15 g. L-proline, 2.99 g. p-nitrophenyl tertiary butyl carbonate and 9 ml. 10% aqueous NaOH were refluxed together in 10 ml. tertiary butanol for 30 minutes. The product, after isolation by the same procedure as outlined in Example 1 was crystallized from water. After recrystallization from methyl ethyl ketone and petroleum ether, it had a melting point of 135–136° C.

EXAMPLE 11

*Tertiarybutyloxycarbonyl-L-Tryptophane*

2.04 g. L-tryptophane, 3.59 g. p-nitrophenyl tertiary butyl carbonate and 2.65 g. sodium carbonate were refluxed together in 20 ml. 50% aqueous tertiary butanol. The product was isolated using the same procedure as outlined in Example 1. After recrystallization from ethyl acetate-petroleum ether, the melting point was 135.5–139.5° C.

EXAMPLE 12

*Tertiarybutyloxycarbonyl-L-Tyrosine*

1.81 g. L-tyrosine, 3.59 g. p-nitrophenyl tertiary butyl carbonate and 2.10 g. sodium bicarbonate were refluxed together in 20 ml. 50% aqueous tertiary butanol for 45 minutes. The product was isolated in the same manner as described in Example 1 and was recrystallized from ethyl acetate and petroleum ether. Melting point was 138–139° C.

EXAMPLE 13

*Tertiarybutyloxycarbonyl-L-Valine*

1.17 g. L-valine, 3.59 g. p-nitrophenyl tertiary butyl carbonate and 2.65 g. sodium carbonate were refluxed together in 20 ml. 50% aqueous tertiary butanol for 30 minutes. After isolation by the same procedure as described in Example 1 the product was recrystallized from petroleum ether. The melting point was 77–79° C.

EXAMPLE 14

*Tertiarybutyloxycarbonyl-DL-Serine*

1.05 g. DL-serine, 3.59 g. p-nitrophenyl tertiary butyl carbonate and 12.5 ml. 2 N NaOH were refluxed together in 10 ml. tertiary butanol. The product, a hydrated oil, was obtained by the procedure used for tertiarybutyloxycarbonyl-phenylalanine. Neutral equivalent found was 221, calculated 223 for the hydrate.

EXAMPLE 15

*Tertiarybutyloxycarbonyl Glycyl-DL-Phenylalanine*

1.11 g. glycyl-DL-phenylalanine, 1.79 g. para-nitrophenyl tertiary butyl carbonate and 6.5 ml. 2 N NaOH solution were refluxed in 5 ml. tertiary butanol for 30 minutes. The product was isolated in the same manner as in Example 1. After recrystallization from ethyl acetate, the pure product melted about 131° C.

EXAMPLE 16

*Ethyl-Tertiarybutyloxycarbonyl Glycyl-DL-Phenylalaninate*

10.47 g. diethyl ethylene pyrophosphite, 7.00 g. tertiarybutyloxycarbonyl glycine, 16 ml. trimethyl phosphite and 7.72 g. ethyl-DL-phenylalaninate hydrobromide in 28 ml. diethyl phosphite were heated together on a steam bath for 30 minutes. After cooling, the product was crystallized by the addition of aqueous sodium bicarbonate, and washed with water. The material was recrystallized from ethyl acetate-petroleum ether and melted from 100–101° C.

EXAMPLE 17

*Tertiarybutyloxycarbonyl Glycyl-DL-Phenylalanine*

Ethyl tertiarybutyloxycarbonyl glycyl-DL-phenylalaninate as prepared in Example 16 was saponified with aqueous sodium hydroxide in dioxane. After acidification of the solution with hydrochloric acid, the product was extracted into ether. Evaporation of the ether gave a crystalline product. The material after recrystallization from ethyl acetate-petroleum ether melted at about 131° C. This product is comparable to the product of Example 15 which was prepared by another process.

EXAMPLE 18

*Ethyl Glycyl-DL-Phenylalaninate Hydrobromide*

3.50 g. of ethyl tertiarybutyloxycarbonylglycyl-DL-phenylalaninate as prepared in Example 16 was suspended in 7 ml. of diethyl phosphite and a solution of hydrogen bromide in 2.5 ml. of diethylphosphite (made by saturation with the gas at 5 to 10° C.) was added. A vigorous reaction immediately took place, with gas evolution and spontaneous warming. Cooling of the solution and dilution with 100 ml. of anhydrous ether caused crystallization of ethyl glycyl-DL-phenylalaninate hydrobromide in almost quantitative yield. After recrystallization from alcohol-ether, this had a melting point of about 155° C.

EXAMPLE 19

*Ethyl-Tertiarybutyloxycarbonyl Glycylglycyl-DL-Phenylalaninate*

1.31 g. diethyl ethylene pyrophosphite, 0.88 g. tertiary-butyloxycarbonyl glycine, 1.65 g. ethyl-glycyl-DL-phenyl-alaninate hydrobromide, as prepared in Example 18, 4.0 ml. trimethylphosphite and 7 ml. diethylphosphite were heated together on a steam bath for 30 minutes and then cooled. Addition of aqueous sodium bicarbonate caused crystallization of the product, which was washed with water. Recrystallization from ethyl acetate-petroleum ether gave a product which melted at about 60° C. and analyzed as the monohydrate.

EXAMPLE 20

*Ethyl Glycyl-DL-Phenylalaninate Hydrobromide*

A mixture of 2.10 g. of t-butyloxycarbonylglycine, 2.74 g. of ethyl DL-phenylalaninate hydrobromide, 2 ml. of trimethylphophite, 2 ml. of diethylphosphite and 2.5 ml. of ethylene diethylphosphite was heated on a steam bath for 20 minutes, giving a clear, colorless solution. This was chilled to about 0° C. and a solution of hydrogen-bromide in 2.5 ml. of diethylphosphite, made by saturation at about 0°, was added. The temperature rose to about 40° C. with spontaneous gas evolution. After about 5 minutes the solution was warmed to about 85° and then diluted with about 65 ml. of ethylacetate. The ethyl glycyl-DL-phenylalaninate hydrobromide crystallized in good yield on standing. This product is equivalent to that prepared in step-wise fashion comprising the combined processes of Examples 16 and 18.

EXAMPLE 21

*Ethyl Tertiarybutyloxycarbonylglycylglycyl-DL-Phenylalaninate*

All of the following reactions were sequentially performed in the same flask, and the final product was then isolated. The final product is essentially equivalent to that prepared in step-wise fashion comprising the combined processes of Examples 16, 18 and 19. A mixture of 2.10 g. of tertiary-butyloxycarbonylglycine, 2.74 g. of ethyl DL-phenylalaninate hydrobromide, 2 ml. of trimethylphosphite, 2 ml. of diethylphosphite and 2.5 ml. of diethyl ethylenepyrophosphite were heated together on a steam bath for 15 minutes in a flask protected from moisture. The resulting solution was cooled in an ice bath, and a solution of hydrogen bromide in 2.5 ml. of diethylphosphite, made by saturation with the gas while cooling in an ice-methanol bath, was added. Immediate gas evolution occurred. After 10 minutes at room temperature, the solution was warmed briefly on a steam bath to ensure completion of the reaction, then cooled. Then 2 ml. of trimethylphosphite was added, followed by 1.93 g. of tertiary-butyloxycarbonylglycine and 2.25 ml. of diethyl ethylenepyrophosphite. The resulting solution was heated on a steam bath for 15 minutes, then cooled and poured into 50 ml. of cold water. The ethyl tertiary-butyloxycarbonylglycylglycyl-DL-phenylalaninate came out as an oil which soon solidified on seeding and scratching. It was collected, washed with water, then 10 ml. of 5% sodium bicarbonate solution to remove acidic byproducts, then water. After drying, it was purified by recrystallization from ethylacetate-petroleum ether. The tripeptide derivative has a melting point of about 60° C. and did not depress the melting point of the product from Example 19.

EXAMPLE 22

*Ethyl Benzyloxycarbonyl-L-Prolyl-L-Leucyl-Glycinate*

1.50 g. tertiarybutyloxycarbonyl-L-leucine monohydrate was placed in a flask and dehydrated in vacuo at 60° C. To the oil formed was added 0.92 g. ethyl glycinate hydrobromide, 1 ml. diethyl phosphite, 1 ml. trimethyl phosphite, and 1.5 ml. diethyl ethylene pyrophosphite. The mixture was heated on the steam bath for 15 minutes and then cooled. To this solution was added 1.5 ml. diethyl phosphite saturated with HBr at 0° C. Vigorous bubbling ensued for about ½ minute. The solution was heated on the steam bath for one minute, then 1 ml. trimethyl phosphite, 1 g. carbobenzoxy-L-pyroline, 1 ml. diethyl phosphite and 1.5 ml. diethyl ethylene pyrophosphite were added. The solution was heated on the steam bath for 15 minutes, then cooled. The product was isolated by the addition of 50 ml. water, and recrystallized from ethanol-water and from ethyl acetate. It had a melting point of 150–151° C. and did not depress the melting point of an authentic sample. This sequence of reactions was done in one flask and accomplished within one hour.

EXAMPLE 23

*Ethyl Tertiarybutyloxycarbonyl Glycyl-DL-Phenylalanyl Glycinate*

3.93 g. diethyl ethylene pyrophosphite, 4.83 g. tertiary-butyloxycarbonyl glycyl-DL-phenylalanine, 2.10 g. ethyl glycinate hydrobromide and 4.0 ml. trimethylphosphite amine were heated together on a steam bath for 30 minutes. The solution was cooled and the addition of water caused precipitation of the peptide. It was washed with aqueous sodium bicarbonate and water, and recrystallized from ethyl acetate-petroleum ether. The melting point was 150–151.5° C.

EXAMPLE 24

*Ethyl Tertiarybutyloxycarbonyl-L-Phenylalanyl Glycinate*

1.40 g. ethyl glycinate hydrochloride, 4.0 ml. trimethyl phosphite, 2.50 g. diethyl ethylene pyrophosphite and 2.65 g. tertiarybutyloxycarbonyl-L-phenylalanine in 7 ml. diethyl phosphite were heated together on a steam bath for 15 minutes. The product crystallized after the addition of water to the cooled solution, and was washed with aqueous sodium bicarbonate and water. Recrystallization from ethyl acetate-petroleum ether gave the product with a melting point of 89.5–90° C.

EXAMPLE 25

*Ethyl-L-Phenylalanyl Glycinate Hydrochloride*

1.00 g. ethyl tertiarybutyloxycarbonyl-L-phenylalanyl glycinate was added to 4.5 ml. of a 2 N hydrochloride solution of diethyl phosphite. Gas evolution began almost immediately and proceeded at room temperature. After 30 minutes the reaction was essentially complete. The product was precipitated by the addition of ether, and was recrystallized from ethanol-ether. The melting point was 122–123° C.

This reaction was also run successfully using ethanol as a solvent in place of diethyl phosphite.

EXAMPLE 26

*Ethyl-L-Phenylalanyl Glycinate Hydrobromide*

0.20 g. ethyl tertiarybutyloxycarbonyl-L-phenylalanyl glycinate was added to a saturated solution of hydrogen bromide in diethyl phosphite. Gas evolution was vigorous and ceased in one minute. Addition of ether caused precipitation of the product which was washed with ether and dried. The product melted at 134–5°, and did not depress the melting point of an authentic sample. Similar treatment of the benzyloxycarbonyl analog gave *no* ethyl-L-phenylalanyl glycinate hydrobromide.

EXAMPLE 27

*Ethyl Tertiarybutyloxycarbonyl-L-Valyl-L-Phenylalanyl-Glycinate*

0.80 g. tertiarybutyloxycarbonyl-L-valine, 1.06 g. ethyl-L-phenylalanylglycinate hydrobromide, 1.5 ml. trimethyl phosphite and 0.8 ml. diethyl ethylene pyrophosphite in 2 ml. diethyl phosphite were heated on a steam bath for 30 minutes. The solution was poured into 20 ml. cold water and the precipitated product washed with 5% sodium bicarbonate solution and with water. After drying, the product melted at about 160° C.

We claim:

1. A process for the production of an alpha-(N-tertiary-butyloxycarbonyl)-naturally occurring amino acid comprising the steps of reacting a naturally occurring amino acid with para-nitrophenyl tertiary butyl carbonate in the presence of a water-miscible organic solvent selected from the group consisting of lower alkyl alcohols and di-(lower)alkyl ketones at a pH of between 8 and 12.

2. The process of claim 1 where the water-miscible organic solvent is tertiary butanol.

3. The process of claim 2 where the amino acid is glycine.

4. The process of claim 2 where the amino acid is L-phenylalanine.

5. The process of claim 2 where the amino acid is L-alanine.

6. The process of claim 2 where the amino acid is L-proline.

7. The process of claim 2 where the amino acid is L-valine.

8. A process for preparing an alpha-(N-tertiary butyloxy carbonyl) tripeptide lower alkyl ester comprising the steps of (a) reacting a member of the group consisting of alpha-(N-tertiarybutyloxycarbonyl)-naturally occurring amino acids with a member selected from the group consisting of lower alkyl esters of alpha naturally occurring amino acids in the presence of a peptide reaction-promoting agent consisting of a lower alkyl pyrophosphite and a phosphite hydrogen halide acceptor selected from the group consisting of di-(lower) alkyl phosphites, tri-(lower alkyl) phosphites, tri-(lower alkenyl) phosphites having allylic unsaturation and lower alkyl alkylene phosphites;

(b) subjecting the product of said step (a), while said product is still in the peptide-forming medium of said step (a), to the action of a hydrogen halide selected from the group consisting of hydrogen bromide and hydrogen chloride whereby the tertiary butyloxycarbonyl alpha N-blocking group is removed; and (c) reacting the product of said step (b), while said product of said step (b) is still in the reaction medium of said step (b), with a member of the group consisting of alpha-(N-tertiary butyloxy carbonyl)-naturally occurring amino acids, whereby there is produced as alpha-(N-tertiary butyloxy carbonyl) tripeptide lower alkyl ester.

9. The process of claim 8 where the said alpha-(N-tertiary butyloxy carbonyl) tripeptide lower alkyl ester is ethyl tertiarybutyloxycarbonylglycylglycyl-DL-phenylalaninate.

References Cited in the file of this patent

UNITED STATES PATENTS

| | | |
|---|---|---|
| 2,592,454 | Mowat et al. | Oct. 3, 1950 |
| 2,705,705 | Chirtel et al. | Apr. 5, 1955 |
| 2,722,526 | Anderson et al. | Nov. 1, 1955 |

OTHER REFERENCES

Stevens et al.: J.A.C.S., vol. 72 (1950), pp. 725–7. (Copy in Library.)

Boissonnas et al.: Helv. Chim. Acta, vol. 36, page 877 (1953).

Anaonetal, adv. in Protein Chemistry, vol. 12, pages 514–515 (1957).